US009393909B2

(12) United States Patent
Espinosa Morales et al.

(10) Patent No.: US 9,393,909 B2
(45) Date of Patent: Jul. 19, 2016

(54) REAR VIEW MIRROR ASSEMBLY FOR MOTOR VEHICLES

(71) Applicant: FICO MIRRORS, S.A., Barcelona (ES)

(72) Inventors: Jose Manuel Espinosa Morales, Barcelona (ES); Adolfo Caballero Guirado, Barcelona (ES); Robert Lopez Galera, Barcelona (ES); Jose Angel Tornero Jaen, Barcelona (ES)

(73) Assignee: FICO MIRRORS, S.A., Barcelona (ES)

( * ) Notice: Subject to any disclaimer, the term of this patent is extended or adjusted under 35 U.S.C. 154(b) by 22 days.

(21) Appl. No.: 14/317,947

(22) Filed: Jun. 27, 2014

(65) Prior Publication Data
US 2015/0008692 A1 Jan. 8, 2015

(30) Foreign Application Priority Data

Jul. 4, 2013 (EP) ..................................... 13175190

(51) Int. Cl.
G02B 7/182 (2006.01)
B60R 1/02 (2006.01)
B60R 1/06 (2006.01)

(52) U.S. Cl.
CPC .... *B60R 1/02* (2013.01); *B60R 1/06* (2013.01)

(58) Field of Classification Search
CPC ............ B60R 1/074; B60R 1/12; B60R 1/02; B60R 1/072; B60R 1/066; B60R 1/06; G02B 7/182; G02B 5/08
USPC .................................. 359/871, 872, 879, 877
See application file for complete search history.

(56) References Cited

U.S. PATENT DOCUMENTS

| 4,029,399 | A | 6/1977 | Haile | |
|---|---|---|---|---|
| 6,064,509 | A | 5/2000 | Tonar et al. | |
| 6,568,839 | B1 | 5/2003 | Pastrick et al. | |
| 7,004,593 | B2* | 2/2006 | Weller | B60R 1/12 340/438 |
| 7,384,162 | B2* | 6/2008 | Shinohara | B60R 1/074 359/841 |
| 2009/0213481 | A1 | 8/2009 | Wilson | |

FOREIGN PATENT DOCUMENTS

| EP | 0864465 | 9/1998 |
|---|---|---|
| EP | 2457770 | 5/2012 |
| ES | 2186514 | 5/2003 |
| WO | 2006014209 | 2/2006 |

OTHER PUBLICATIONS

Extended European Search Report for EP13175190.1 issued by the European Patent Office, Berlin, Germany dated Sep. 16, 2013.

* cited by examiner

*Primary Examiner* — Euncha Cherry
(74) *Attorney, Agent, or Firm* — Peter B. Scull; Hamilton, DeSanctis & Cha LLP

(57) ABSTRACT

A mirror pane, a mirror pane carrying element, a cover, and a supporting device associated with the carrying element and the cover includes supporting elements formed on an inner surface of the cover extending perpendicular to an inner surface of the mirror pane. It may also include reinforcing ribs in portions of the mirror pane to be received into slots of the carrying element. A clipping device is provided for coupling the mirror pane to the carrying element which includes a number of flanges and a number of corresponding openings whose plane is mutually perpendicular.

19 Claims, 2 Drawing Sheets

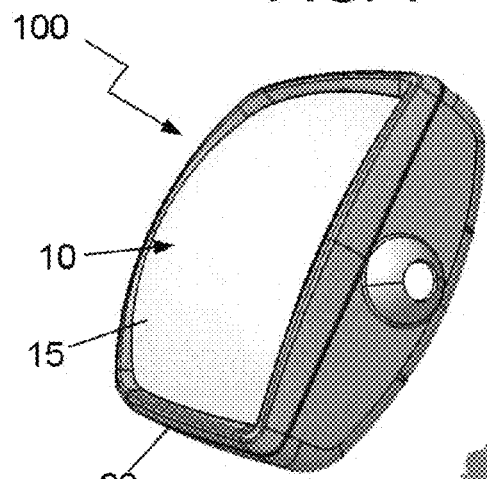
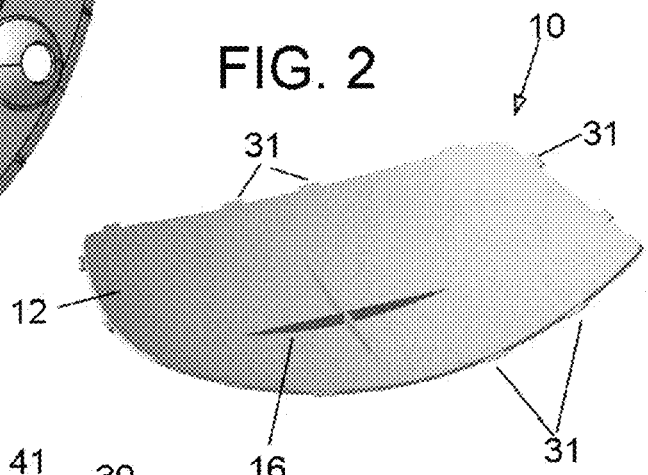
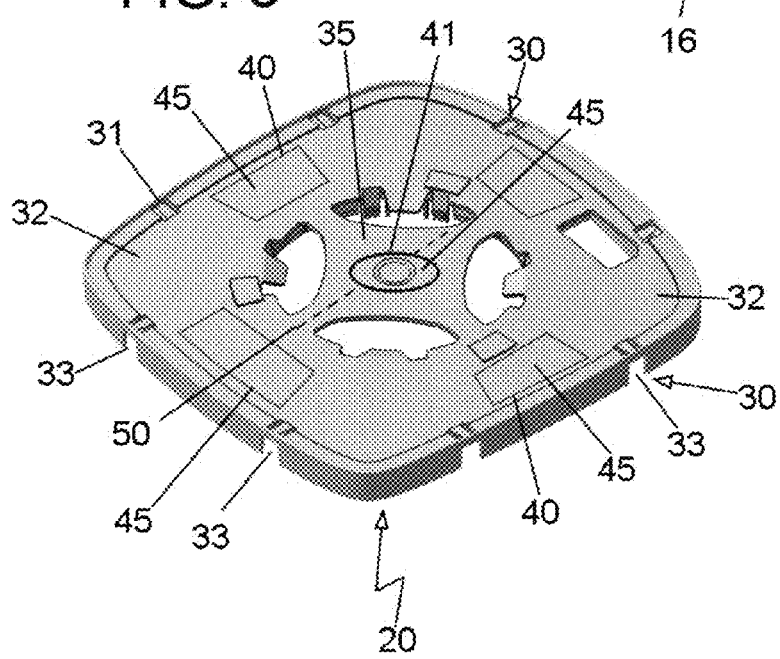

REAR VIEW MIRROR ASSEMBLY FOR MOTOR VEHICLES

The present disclosure relates to mirror assemblies for motor vehicles and specifically to an improved device for attaching internal parts in a rear view assembly for a motor vehicle or the like.

BACKGROUND

Rear view mirror assemblies currently comprise a support structure also referred to as frame and a mirror element comprising a thin substrate or mirror pane, which may be made, for example, of glass. The mirror pane generally has a first reflective surface.

More recently, in rear view mirror assemblies the mirror pane is made of plastic material coated with at least one thin reflective layer on a first surface. Plastic based mirror panes have significant advantages over conventional glass based mirror panes. The former are significantly lighter and more cost effective than the latter. In addition, plastic mirror panes have an increased resistance to temperature changes and a good impact resistance as compared to glass based mirror panes. A further significant advantage in plastic based mirror panes is that the manufacture of the mirror pane is more flexible, such that large variety of forms can be made specifically with a wide range of curvatures, and with virtually any irregular surface being possible to be formed.

In such types of mirror assemblies where the mirror pane comprises a substrate made of plastic material coated with at least one thin reflective layer on the first surface, attaching of the mirror pane to the support structure is a delicate operation. It has been found that current ways of attaching the mirror pane to the support structure involves complexity and costs.

Document US2009213481 discloses a mirror assembly for motor vehicles comprising a housing having an opening and a mirror secured to the housing at the opening. The mirror is a unitary structure having a periphery and a flange extending around a portion of the periphery. The flange is adapted to be received into a channel formed in the periphery of a backing plate.

EP2457770 provides a mirror assembly comprising a mirror pane made of plastic material coated with at least one reflective layer on a first surface. The mirror pane has three or more clips for attaching to a support structure on a second surface of the mirror pane. The clips are configured such that they have at least one shoulder for increasing the contact area between the clip and the second surface.

EP0864465 refers to a mirror assembly having a reflective member moulded from plastics material attached to a support structure. The reflective member has a front surface with reflective coating and a rear surface with lugs having a ramp face leading to a detent edge. Lugs are intended to snap fit over a circular disk formed on an end of a support pillar which projects within a mirror case.

Notwithstanding the variety of solutions existing in the prior art for attaching parts in a rear view assembly there is still a need for a low cost, simple and effective devices and methods for attaching parts in a rear view assembly for motor vehicles.

SUMMARY

A rear view mirror assembly for motor vehicles as defined herein is provided herein with which the above need is met. In addition, it has been found that the present rear view mirror assembly provides further advantages.

The present rear view mirror assembly may include a mirror pane that can be made of plastic materials such as polycarbonate (PC), polymethyl methacrylate (PMMA), plastic polymers such as allyl diglycol carbonate (ADC) CR-39, or similar materials. Such materials are selected as they are lighter than glass, have higher impact resistance and are more resistant to changes in temperature. The mirror pane may have a variable thickness cross-section. In one example, the mirror pane may be of the order of 1.2-2.0 mm thick. Other similar materials and configurations are not ruled out within the meaning of this disclosure.

The present mirror pane has a first surface and a second surface. One of the surfaces of the mirror pane (first surface) may be coated with at least one thin reflective layer. In this respect, the mirror pane may be provided, for example, with at least one metallized surface. In some cases, the mirror pane could also include a device for avoiding blurring of the reflected image.

In the present case, it is preferred that the present mirror pane is made of a single piece, obtained for example through an injection moulding process. This process allows mirror panes with high visual properties having different thickness to be easily obtained, even mirror panes with very thin thicknesses and with a wide range of diameters and shapes defining irregular surfaces.

A carrying element is provided for carrying the mirror pane. The carrying element may be, e.g., a backplate or frame made of a plastic material suitable for carrying the mirror pane. The carrying element may be made of a single piece, obtained for example through an injection moulding process.

The carrying element may be provided with a number of slots for receiving corresponding ribs formed in the mirror pane. Said ribs formed in the mirror pane may perform a reinforcing function of the mirror pane.

The slots may be formed in one or more portions of the carrying element. Said portions of the carrying element may be selected from at least one of a central portion and a peripheral portion of the carrying element.

The present rear view mirror assembly also comprises a cover. The cover is defined as a housing designed for at least partially receiving the carrying element with the mirror pane.

A supporting device is further provided formed in or associated with the cover. The supporting device comprises a number of supporting elements. The supporting elements extending from an inner surface of the cover towards an inner surface of the mirror pane to abut the inner surface of the mirror pane.

Therefore, the supporting device comprises structural elements formed of supporting elements as stated above, for reinforcing the mirror pane carrying element. However, the supporting device serves also the purpose of reinforcing the mirror pane when it is assembled into the carrying element. This is important since the mirror pane is typically flexible for adapting to variable curvatures. The structural and reinforcing functions of the supporting device also ensure a good performance in terms of reducing image distortion and good mechanical behaviour of the mirror assembly.

In some examples, a first clipping device may be provided. The first clipping device is designed for coupling the mirror pane and the carrying element together. In one example, the first clipping device may comprise at least one flange, or preferably a number of flanges. The flange or flanges may be in the form of hooks formed in the mirror pane. The hooks are suitably sized and shaped to enhance attachment of the mirror pane to the carrying element. The anchoring hooks of the mirror pane are shaped to engage a corresponding coupling portion of the carrying element.

This flange or flanges may be formed on a peripheral portion defined in at least one of the mirror pane and the carrying element. At least one corresponding opening is formed in a peripheral portion of the other of at least the mirror pane and the carrying element. The openings are adapted for receiving the flange or flanges. The openings are formed in a plane that is substantially perpendicular to that of the flange.

In some specific cases of the present rear view mirror assembly, the openings formed in a peripheral portion of the mirror pane and/or the carrying element may have a substantially U configuration, open at one side thereof. This particular U shaped configuration of the openings allows removal of the flange from the corresponding opening to be facilitated. Such U shaped configuration of the openings is also advantageous in the manufacturing process of the rear view mirror assembly since demoulding of the flanges is facilitated. Furthermore, a single step is only required for the assembly operation of the mirror pane in the mirror pane carrying element. This involves a great improvement over the four-step assembly operation required in the prior art mirror assemblies which involves at least preparing and heating an adhesive, placing the adhesive onto the mirror pane, fitting the mirror pane into the carrying element and pressing the sub-assembly. In addition, with this particular U shaped configuration of the openings there is a reduced play between the flanges and the corresponding openings. This also helps in facilitating assembly operations.

As an alternative, the openings may have a closed configuration. This particular closed configuration of the openings is advantageous as it enhances robustness. The closed configuration of the openings further enhances the mechanical properties of the assembly rendering it stronger while also helping in facilitating assembly.

A least one of the flange and the opening may include at least one ramp. The ramps are suitably designed to facilitate coupling the mirror pane and the carrying element together in an easy way.

The clipping device may further comprise at least one pressure tab, but preferably a number of pressure tabs arranged in correspondence with the openings. In use, the pressure tabs abut the respective flanges. This ensures a correct coupling of the mirror pane with the carrying element.

The above mentioned first clipping device may be formed in a final design step. This involves that they do not need to be arranged at specific points of the geometry but in any part thereof.

The configuration of the outer contour of the mirror pane carrying element and the housing match each other. This provides the mirror assembly with a good appearance. No gaps are visible between the parts so aerodynamics are also enhanced. Therefore, the mirror pane and the carrying element form a monoblock element. This feature also facilitates the mirror assembly to be assembled on a mirror actuator.

The carrying element may be provided with at least one protruding area, with a number of protruding areas being preferred. The protruding areas in the carrying element may be formed in one or more portions selected from a central and a peripheral portion of the cover.

A number of adhesive pads may be provided in correspondence with said protruding areas of the carrying element. These adhesive pads may be double-sided adhesive pads of any shape as long as they have good adhesive properties and enough thickness for attachment of the mirror pane with the mirror pane carrying element together with the cover. According to a very specific example of the present mirror assembly, a set of five adhesive pads is used, with four being rectangular in shape while the remainder being circular in shape. Other configurations, shapes, number and distribution of the adhesive pads are however not ruled out. In one example of the adhesive pads, they may be double-sided adhesive pads made of polyurethane (PUR) or polyethylene (PE).

The present rear view mirror assembly may further comprise a second clipping device for coupling the carrying element with the cover together. The second clipping device may comprise at least one flange formed on a peripheral portion of at least one of the carrying element and the cover. The second clipping device may further comprise at least one corresponding opening formed in a peripheral portion of the other of at least the carrying element and the cover.

Any of the parts involved in the present rear view mirror assembly may be made by an injection moulding process. In some cases or for some specific parts of the present a rear view mirror assembly, an injection compression moulding process could be used for their manufacture.

Additional objects, advantages and features of examples of the present rear view mirror assembly for motor vehicles will become apparent to those skilled in the art upon examination of the description, or may be learned by practice thereof.

BRIEF DESCRIPTION OF THE DRAWINGS

A particular non-limiting example of the present rear view mirror assembly for motor vehicles will be described in the following in more detail and with reference to the appended drawings.

In the drawings:

FIG. 1 is a perspective view of one example of the present rear view mirror assembly for motor vehicles;

FIG. 2 is a perspective view of one example of the mirror pane in the mirror assembly shown in FIG. 1;

FIG. 3 is a perspective view of one example of the carrying element of the mirror assembly shown in FIG. 1;

DETAILED DESCRIPTION OF EXAMPLES

The specific example shown in the FIGS. 1-6 corresponds to one possible example of the present rear view mirror assembly, which has been indicated as a whole at 100. The mirror assembly 100 mainly comprises a mirror pane 10, a mirror pane carrying element 20 and a cover 60.

The mirror pane 10 is in FIG. 2. It is formed of a plastics single piece obtained through an injection moulding process. The mirror pane 10 is made of a suitable plastic material such as polymethyl methacrylate (PMMA), polycarbonate (PC) of allyl diglycol carbonate (ADC) CR-39 due to their improved properties over glass, for example. In this example, the mirror pane 10 is a variable thickness laminar element, such as for example 1.2-2.0 mm thick. One of the surfaces of the mirror pane 10 is coated with at least one thin reflective layer, i.e. a metallized surface.

Figure 4:
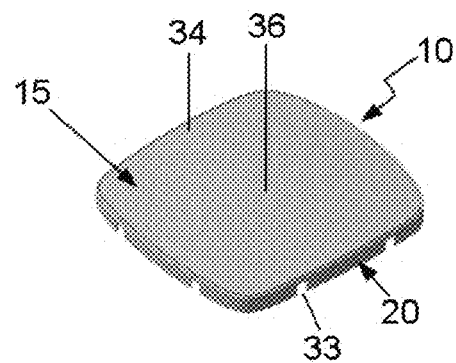
FIG. 4 is a perspective view of the mirror pane shown in FIG. 2 attached to the carrying element shown in FIG. 3 as part of the rear view mirror assembly shown in FIG. 1.

The mirror pane carrying element 20 is in FIG. 3. The carrying element 20 is a backplate or frame suitably sized and shaped for carrying the mirror pane 10 as shown in FIG. 4. As with the mirror pane 10, the carrying element 20 is formed of a single piece made of a plastic material obtained through an injection moulding process.

As shown in FIG. 3 of the drawings, the carrying element 20 is provided with a number of slots 50. These slots 50 are adapted, in terms of thickness, length, height, position, number, etc, for receiving corresponding ribs 16 formed in the mirror pane 10 which will be described below. The slots 50 of the carrying element 20 may be formed in one or more portions of the carrying element 20. In the example shown in FIG. 3, the slots 50 of the carrying element 20 are formed in a central portion 35 thereof. However, the slots 50 of the carrying element 20 could be alternatively or additionally in a peripheral portion 32 thereof, depending on where the corresponding ribs 16 are formed in the mirror pane 10, that is, in its central portion 36 (as shown in the example of FIG. 3) and/or in its peripheral portion 34.

In general, the ribs 16 of the mirror pane 10 include portions projecting from an inner surface 12 of the mirror pane 10. The ribs 16 of the mirror pane 10 may be configured in a number of different ways selected from one or more of diametrical cross-shaped ribs 12 (as shown in FIG. 2); central pins; central bosses; central or perimetral portions (e.g. circular portions) with variable thickness; bottom clips (e.g. pairs of parallel clips projecting from the inner surface of the mirror pane 10) which could be designed to match a slider mechanism for suitable attachment of the mirror pane 10; perimetral windows and combinations thereof. Such different examples of the ribs 16 of the mirror pane 10 can be obtained through a molding process. The thickness of the ribs 16 in any of the above specific examples would be a function of the mirror pane 10 thickness. In the preferred example, the mirror pane 10 is provided with center ribs 16 (as shown in FIG. 2) to stiffen purposes on that area together with additional perimetral ribs 16 (not shown) to increase stiffness.

Figure 5:
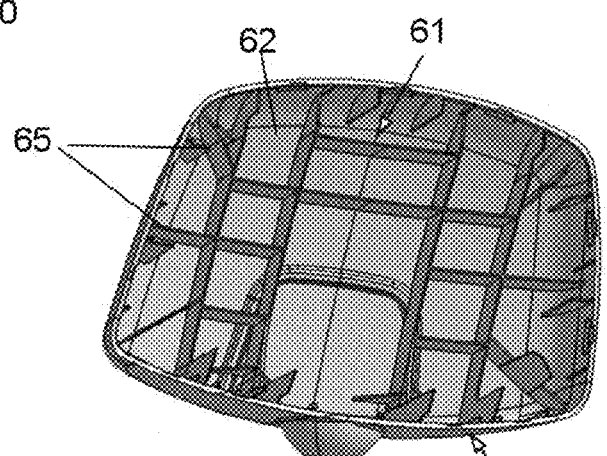
FIG. 5 is a perspective view of one example of a cover of the mirror assembly shown in FIG. 1.

One example of the cover 60 is shown in FIG. 5. The cover 60 has been also illustrated in the perspective view of the mirror assembly 100 shown in FIG. 1. The cover 60 is configured as a housing for receiving the carrying element 20 and the mirror pane 10. Associated both with the carrying element 20 and the cover 60 is a supporting device 61. The supporting device 61 acts as a structural element for reinforcing the mirror pane carrying element 20 and for reinforcing the mirror pane 10 when assembled therein. As shown in FIG. 5 of the drawings, the supporting device 61 comprises a number of supporting elements 65 formed on an inner surface 62 of the cover 60. In the example shown in FIG. 5, the supporting elements 65 are walls arranged such that they extend perpendicular to the inner surface 62 of the mirror pane 10 towards the mirror pane 10 in the assembled condition.

Associated both with the mirror pane 10 and the carrying element 20 is a first clipping device 30. The first clipping device 30 comprises a plurality of flanges 31. As shown in FIG. 2 the plurality of flanges 31 are formed in a peripheral portion 32 of the mirror pane 10. The flanges 31 may be in the form of hooks designed for enhancing attachment of the mirror pane 10 to the carrying element 20.

Alternatively or additionally the flanges 31 or hooks could be formed on a central portion 35 of the mirror pane 10. The plurality of flanges 31 in the mirror pane 10 are intended to be received into corresponding openings 33 formed on a corresponding portion of the carrying element 20, that is, in a peripheral portion 32 and/or a central portion 35 of the carrying element 20.

The first clipping device 30 defined by the flanges 31 of the mirror pane 10 and the openings 33 of the carrying element 20 serves the purpose of coupling of the mirror pane 10 with the carrying element 20.

The above coupling function is of course also possible by providing the plurality of flanges 31 on a peripheral portion 32 and/or a central portion 35 of the carrying element 20 and with the openings 33 formed on a peripheral portion 34 and/or a central portion 36 of the mirror pane 10.

Figure 6:
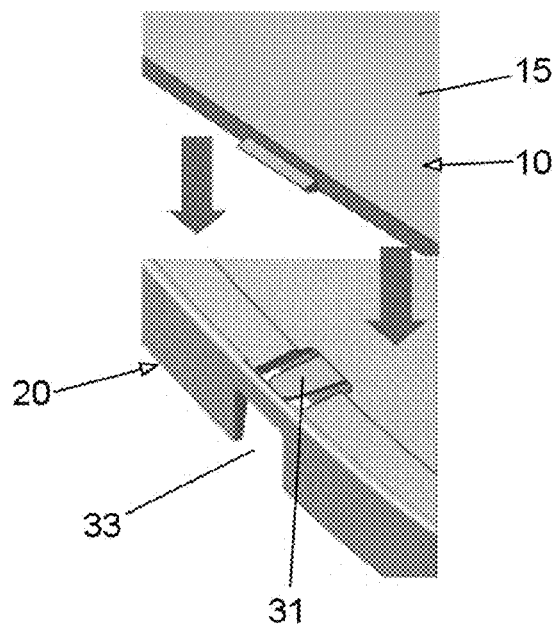
FIG. 6 is a perspective part view of pane shown separated from the carrying element shown to shown the first clipping device.

In any case, the openings 33 are formed in a plane substantially perpendicular to that of the flanges 31, as clearly shown in FIG. 6.

In the example shown in FIGS. 3, 4 and 6, the openings 33 are formed in a peripheral portion 32 of the carrying element 20 and have a substantially U configuration, open at one side thereof. This example is preferred as it allows removal of the flange 31 from the opening 33 to be facilitated and its manufacturing process is easy since the demoulding step is facilitated. With this U shaped configuration of the openings 33, a single step is only required for the assembly operation of the mirror pane 10 in the mirror pane carrying element 20 with a reduced play in use.

However, other configurations of the openings 33 are possible. For example, the openings 33 may have a closed configuration in view of enhancing robustness.

As shown in FIG. 6, the flange 31 includes a ramp 37. The ramp 37 in each flange 31 is designed to facilitate coupling the mirror pane 10 to the carrying element 20, that is, to facilitate insertion of the flange 31 into the corresponding opening 33. The ramp 37 in each flange 31 may be formed in one, in some or of in all of the flanges 31. The ramp 37 may be formed of a single ramp of it may comprise a number of sub-ramps.

According to FIG. 3, the first clipping device 30 further comprises a plurality of pressure tabs 38 arranged in correspondence with the openings 33 of the carrying element 20. In use, that is with the mirror pane 10 fitted to the carrying element 20, the pressure tabs 38 abut the corresponding flanges 31.

Although not shown in the figures, the carrying element 20 is attached to the cover 60 through a second clipping device. This second clipping device comprises a number of flanges that may be formed on a peripheral portion of the carrying element 20. However, alternatively or additionally, the flanges could be formed on a peripheral portion of the cover 60. The second clipping device also comprises openings formed in a peripheral portion of the carrying element 20 although, according to the above, they could be formed in a peripheral portion of the cover 60.

The following is a further example for attaching of the elements in the present mirror assembly which may be used alone or in combination with the above mentioned examples.

In the particularly preferred example shown in the FIG. 3, the carrying element 20 has a plurality of protruding areas 40, 41. The plurality of protruding areas 40, 41 has in this specific example four substantially rectangular peripheral protruding areas 40 formed in the peripheral portion 32 of the carrying element 20 and an additional central circular protruding area 41 formed in the central portion 35 of the carrying element 20.

In correspondence with the protruding areas 40, 41 of the carrying element 20, corresponding double-sided adhesive pads 45 are provided. The adhesive pads 45 serve the purpose of attaching the mirror pane 10 with the carrying element 20 together.

Although only a number of particular examples of the present rear view mirror assembly for motor vehicles have been disclosed herein, it will be understood by those skilled in the art that other alternative examples, uses and obvious modifications and equivalents thereof are possible. Furthermore, the present disclosure covers all possible combinations of the particular examples described.

The scope of the present disclosure should therefore not be limited by particular the example herein disclosed, but should be determined only by a fair reading of the claims that follow.

Reference signs related to drawings and placed in parentheses in a claim, are solely for attempting to increase the intelligibility of the claim, and shall not be construed as limiting the scope of the claim.

The invention claimed is:

1. Rear view mirror assembly for motor vehicles, comprising:
    a mirror pane;
    a mirror pane carrying element;
    a cover for at least partially receiving the carrying element with the mirror pane; and
    a supporting device formed with the cover,
    wherein the supporting device comprises a number of supporting elements formed on an inner surface of the cover, the supporting elements extending to abut an inner surface of the mirror pane.

2. Rear view mirror assembly as claimed in claim 1, wherein a series of ribs are provided in one or more portions of the mirror pane selected from a central portion and a peripheral portion of the mirror pane.

3. Rear view mirror assembly as claimed in claim 2, wherein the carrying element is provided with a number of slots formed in one or more portions of the carrying element selected from a central portion and a peripheral portion of the carrying element for receiving the mirror pane ribs.

4. Rear view mirror assembly as claimed in claim 1, further comprising a first clipping device for coupling the mirror pane and the carrying element together.

5. Rear view mirror assembly as claimed in claim 4, wherein the first clipping device comprises at least one flange formed on a peripheral portion of at least one of the mirror pane and the carrying element; and at least one opening formed in a peripheral portion of the other of at least the mirror pane and the carrying element adapted for receiving the flange, with the opening being formed in a plane substantially perpendicular to that of the flange.

6. Rear view mirror assembly as claimed in claim 5, wherein the opening has a substantially U configuration, open at one side thereof to facilitate removal of the flange from the corresponding opening.

7. Rear view mirror assembly as claimed in claim 5, wherein the opening has a closed configuration to enhance robustness.

8. Rear view mirror assembly as claimed in claim 5, wherein at least one of the flange and the opening includes at least one ramp to facilitate insertion of the flange into the corresponding opening.

9. Rear view mirror assembly as claimed in claim 4, wherein the first clipping device further comprises pressure tabs arranged in correspondence with the openings such that, in use, the pressure tabs abut the respective flanges.

10. Rear view mirror assembly as claimed in claim 4, wherein the flanges are in the form of anchoring hooks formed in the mirror pane for attachment to the carrying element.

11. Rear view mirror assembly as claimed in claim 4, wherein the mirror pane has a variable thickness cross-section.

12. Rear view mirror assembly as claimed in claim 1, wherein the cover is provided with at least one protruding area formed in one or more portions selected from a central and a peripheral portion of the cover.

13. Rear view mirror assembly as claimed in claim 12, wherein at least one adhesive pad is provided in correspondence with at least one of said protruding areas.

14. Rear view mirror assembly as claimed in claim 1, wherein at least one of the mirror pane and the carrying element is made of plastic.

15. Rear view mirror assembly as claimed in claim 1, wherein the mirror pane has at least one metallized surface.

16. Rear view mirror assembly as claimed in claim 1, wherein at least one of the mirror pane and the carrying element is made of a single piece.

17. Rear view mirror assembly as claimed in claim 1, wherein at least one of the mirror pane and the carrying element is made by an injection moulding process.

18. Rear view mirror assembly as claimed in claim 1, further comprising
    a second clipping device for coupling the carrying element with the cover together;
    the second clipping device comprising at least one flange formed on a peripheral portion of at least one of the carrying element and the cover; and
    at least one opening formed in a peripheral portion of the other of at least the carrying element and the cover.

19. Rear view mirror assembly as claimed in claim 4, further comprising
    a second clipping device for coupling the carrying element with the cover together;
    the second clipping device comprising at least one flange formed on a peripheral portion of at least one of the carrying element and the cover; and
    at least one opening formed in a peripheral portion of the other of at least the carrying element and the cover.

* * * * *